(12) United States Patent
Nenonen et al.

(10) Patent No.: US 7,020,332 B2
(45) Date of Patent: Mar. 28, 2006

(54) METHOD AND APPARATUS FOR ENHANCING A DIGITAL IMAGE BY APPLYING AN INVERSE HISTOGRAM-BASED PIXEL MAPPING FUNCTION TO PIXELS OF THE DIGITAL IMAGE

(75) Inventors: Petri Nenonen, Tampere (FI); Markku Vehvilainen, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 641 days.

(21) Appl. No.: 09/742,055

(22) Filed: Dec. 22, 2000

(65) Prior Publication Data

US 2001/0046320 A1 Nov. 29, 2001

(30) Foreign Application Priority Data

Dec. 22, 1999 (GB) .................................. 9930409

(51) Int. Cl.
*G06K 9/00* (2006.01)

(52) U.S. Cl. ........................................ 382/169; 382/271

(58) Field of Classification Search ................ 382/168, 382/169, 274, 263, 266–269, 254, 264, 271
See application file for complete search history.

(56) References Cited

U.S. PATENT DOCUMENTS

| | | | |
|---|---|---|---|
| 4,833,722 A | | 5/1989 | Morton et al. |
| 5,793,886 A | | 8/1998 | Cok |
| 5,959,696 A | * | 9/1999 | Hwang .................... 348/678 |
| 5,982,926 A | * | 11/1999 | Kuo et al. ................. 382/167 |
| 5,995,656 A | * | 11/1999 | Kim .......................... 382/169 |
| 6,442,294 B1 | * | 8/2002 | Nishizawa et al. ......... 382/168 |
| 6,449,390 B1 | * | 9/2002 | Inoue ........................ 382/168 |
| 6,611,296 B1 | * | 8/2003 | Nieuwenhuizen et al. .. 348/625 |
| 6,640,001 B1 | * | 10/2003 | Roehrig et al. ............. 382/128 |

FOREIGN PATENT DOCUMENTS

| | | |
|---|---|---|
| EP | 0809209 | 11/1997 |
| EP | 0856813 | 8/1998 |
| EP | 0905650 | 3/1999 |
| GB | 2319685 | 5/1998 |

OTHER PUBLICATIONS

Vinod et al, A connectionist approach for gray level image segmentation, Proceedings of the 11th IAPR International Conference on Pattern Recognition, Aug. 30-Sep. 3, 1992, pp 489-492.*

Gonzalez et al, Digital Image Processing, 1993, Addison-Wesley Publishing Company, pp 173-180.*

NEC Press Release, NEC Develop W-CDMA based Mobile Videophone, Sep. 22, 1999, http://www.nec.co.jp/press/en/9909/2201.html.*

* cited by examiner

*Primary Examiner*—Von J. Couso
(74) *Attorney, Agent, or Firm*—Foley & Lardner

(57) ABSTRACT

A method and associated device wherein an inverse histogram based pixel mapping step is combined with an edge enhancement step such as unsharp masking. In such an arrangement the inverse histogram based pixel mapping step improves the performance of the unsharp masking step, serving to minimize the enhancement of noise components while desired signal components are sharpened.

74 Claims, 8 Drawing Sheets

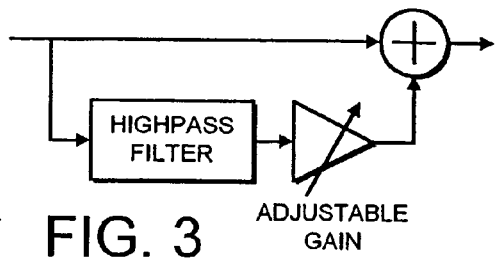
PRIOR ART FIG. 3
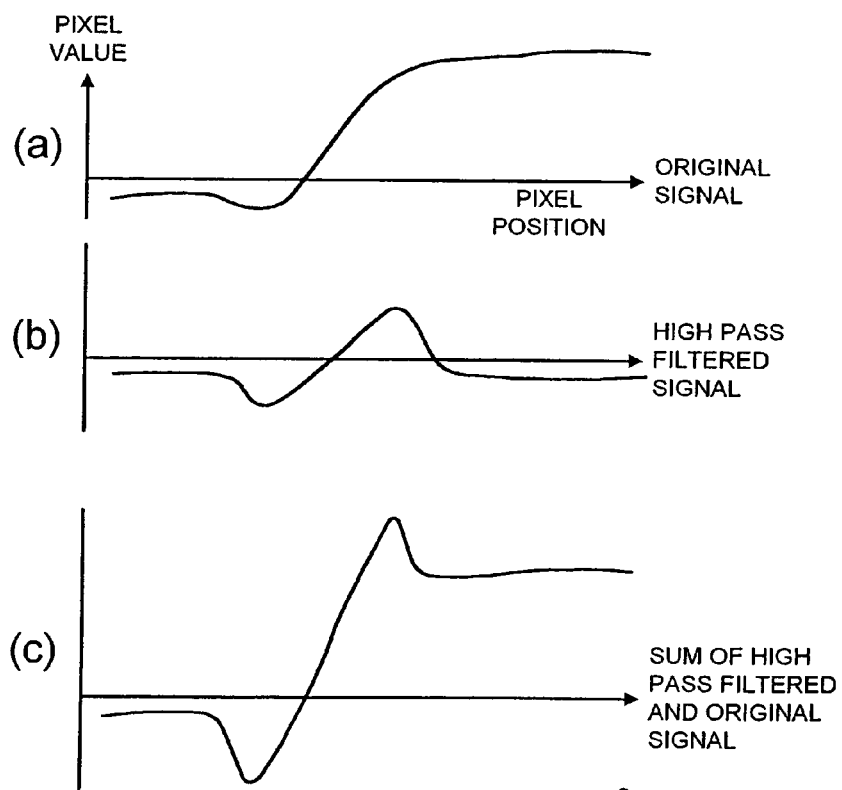
FIG. 4 PRIOR ART

METHOD AND APPARATUS FOR ENHANCING A DIGITAL IMAGE BY APPLYING AN INVERSE HISTOGRAM-BASED PIXEL MAPPING FUNCTION TO PIXELS OF THE DIGITAL IMAGE

BACKGROUND OF THE INVENTION

The present invention relates to digital imaging technology, and more particularly to contrast and edge enhancement in still and moving digital imaging.

Digital imaging offers a great many advantages over traditional analog techniques, supporting services such as video telephony and multi-media applications. Accordingly, digital imaging is currently the subject of extensive research.

One particular area of digital imaging research is that of image enhancement. In digital imaging, there is need for image enhancement because images typically suffer from various types of degradation, such as lack of sharpness, noise, compression artefacts, and poor contrast and brightness. Mobile imaging products presently under development are especially prone to such degradations due to the low performance of current digital camera devices and the narrow data transmission bandwidth typically available in mobile communications networks, which requires the use of high compression ratios. In digital camera products, poor image quality arises from shortcomings in fundamental sensor properties. The lack of contrast typically arises from the sensor itself, while the lack of sharpness is the result of both low quality optics and low sensor resolution. Low resolution sensors are likely to be used in the imaging systems of forthcoming first generation mobile telecommunication terminals with image presentation and manipulation functionality. Thus, there is a need for methods to enhance image contrast and sharpness, and in current digital image enhancement techniques this is commonly carried out by concealing artefacts and reconstructing degraded parts of an image.

Image enhancement principally concerns accentuation of image features such as edges, boundaries, or contrast. This makes image details more visible and makes images look subjectively sharper or crisper without appearing unnatural, therefore making a graphic display more useful for display and analysis. Whilst the enhancement process does not increase the inherent information content in the data, it does increase the dynamic range of chosen features so that they can be more easily detected.

Image enhancement techniques can be divided roughly into three sub-classes comprising point, spatial, and transform operations.

Point operations are performed on individual pixels and as such are independent of surrounding pixel values. Pixel mapping operations are one example of point operations. Pixel mapping involves mapping a pixel value to a new value with a function, for example:

$$y_{i,j} = f(x_{i,j}),$$

where
i, j=pixel's coordinates
y=output pixel
x=input pixel
and $f$ is a function relating x and y.

Spatial operations are performed on groups of pixels. Certain image smoothing and filtering functions are spatial operations where, for example, a pixel's value may be modified by taking an average of surrounding pixel values.

Transform operations convert image data from pixel values into another form, for example spatial frequency components. Discrete cosine transforms (DCT) and wavelet transforms are examples of transform operations commonly used in image processing applications.

Examples of enhancement techniques in the sub-classes outlined above include techniques such as grey level and contrast manipulation, noise reduction, edge crispening and sharpening, filtering, interpolation and magnification, and pseudo-colouring.

In practice, images taken by a digital camera normally suffer from smoothness problems irrespective of the pixel resolution. This means that there is always likely to be a need for image sharpening techniques. Image sharpening can be performed by applying various forms of contrast enhancement (stretching/shrinking) and edge enhancement techniques. Contrast enhancement is a point operation that can be used to enhance images taken in poor or non-uniform lighting conditions, or acquired with an imaging sensor having a small dynamic range. Contrast manipulation also tends to alter the visibility of edges, which changes the perceived sharpness of the image. Edge enhancement techniques are typically spatial operations and they enhance images that suffer from overall smoothness. A technique known as unsharp masking is an example of an edge enhancement technique.

Referring first to contrast enhancement, a well know method for enhancing contrast is histogram-based pixel mapping. In this method a pixel-mapping function is formed utilizing a histogram of the image, or a part of an image. The histogram contains the number of pixel occurrences at each level of the input signal range. The mapping function is derived from a cumulative histogram so that it has high slope corresponding to high values in the histogram. The cumulative histogram is typically formed using an equation having the form:

$$C_i = \sum_{k=0}^{i} H_k,$$

where
$C_i$=bin i of cumulative histogram
$H_k$=bin k of histogram

Note that a bin is a pixel value range, that may cover a single pixel value or more than one pixel value.

In the basic method the mapping function is:

$$\theta(x) = C_x$$

The mapping function or the cumulative histogram is typically scaled so that the mapping covers substantially exactly the available dynamic range, i.e.;

$$f(L) = L,$$

where
L=largest value of the available dynamic range
The scaling is achieved, for example, using equation:

$$f(x) = L \frac{C_x}{C_L}$$

The above equations can be found in slightly varying forms in many signal processing textbooks. For example, in one alternative approach the first nonzero bin is subtracted from the histogram before or during computation of the cumulative histogram. If such a subtraction is not performed the darkest pixel value of the image is not mapped to zero ($C_0 \neq 0$). Other modifications also exist.

The above equations are usable substantially only if there are as many bins as signal levels, for example, 256 bins are required for a signal with 8 bits/sample. If fewer bins are used, each bin contains pixels belonging to a certain signal range. The above equations provide mapping function values at the borders of bins. Additional values may be obtained by interpolation.

Examples of a histogram, a cumulative histogram and corresponding mapping function are presented in FIG. 1.

Using histogram-based pixel mapping techniques, the contrast of an image can be increased by mapping input pixel values to output pixel values with a linear function having a slope (i.e. derivative) greater than one. A slope less than one decreases contrast, while a slope equal to one produces no change in contrast. The mapping function can also be non-linear, having a varying slope. In this case contrast around some pixel values of the image is increased, the contrast in other pixel value ranges may be decreased or not altered at all. An example of a non-linear mapping function is shown in FIG. 2.

An acknowledged limitation of histogram-based pixel mapping is that it tends to make noise and other artefacts disturbingly visible. Because increasing contrast increases the visibility of variations in the input signal, if there is noise present in the input signal, its visibility is also increased. Because of this, histogram-based pixel mapping is often considered unsatisfactory for contrast enhancement of natural images.

Nevertheless, histogram-based pixel mapping is the basis for a substantial number of contrast enhancement algorithms. So, whilst these algorithms form a mapping function based on the image histogram, attempts are made to mitigate the unwanted effects of the basic mapping procedure using modifications and additions to the basic algorithm. These modifications include, for example, reshaping the histogram, reshaping the mapping function, filtering the image, the histogram or the mapping function and limiting the maximum value of the histogram.

Turning now to edge enhancement, specifically in the context of unsharp masking, this is a spatial filtering technique for improving the visibility of edges and thus improving perceived image quality. Unsharp masking is commonly implemented in the form of a highpass filter in series with an adjustable gain block, as shown in FIG. 3. In the illustrated arrangement, a highpass filtered and scaled image signal is added to the original image signal as shown in FIG. 4a. Thus, the desired improvement is achieved by emphasising high frequency components of the image. Specifically, the output of the highpass filter represents a second order derivative of the original signal, as represented in FIG. 4b. When the highpass filtered signal is added back to the original signal, it creates under and overshoots around edges as shown in FIG. 4c. The human visual system itself creates similar under and overshoots around sharp edges. This phenomenon is known as the Mach band effect. It demonstrates that the human visual system perceives edges in a non-linear manner, and that perception depends not only on luminance but also on image structure. For this reason, the human visual system perceives edges with added under and over shoot, such as those produced by unsharp masking, as sharper edges.

Unsharp masking also tends to produce some undesirable effects. The presence of a highpass filter makes the system sensitive to noise and compression artefacts. Thus, unsharp masking typically produces perceivable artefacts, which are especially visible in uniform areas of an image.

Accordingly, it has been recognised that in order to improve image quality it would be appropriate to modify an input signal of the highpass filter, especially when there is a noise component present in an image. One such modification, known in the art, is to use a standard, predefined, or fixed pixel mapping function prior to unsharp masking. Using a conventional fixed pixel mapping function, it is possible to emphasise certain edges, whilst limiting unwanted noise enhancement. FIG. 5 depicts an unsharp masking scheme that utilises pixel mapping prior to highpass filtering. In the illustrated arrangement, a pixel mapping function is applied to the image before unsharp masking in order to limit the unwanted enhancement of noise components that occurs as a result of high-pass filtering.

FIG. 6 shows two possible pixel mapping function curves suitable for use prior to unsharp masking. Curve 1 suppresses high and low level signals and stretches mid-range pixel values. Accordingly, in the highpass filter, high and low level edges are suppressed and mid level edges are enhanced. In Curve 2 mid level edges are suppressed and high and low level edges are enhanced. In this way, the effect of using pixel mapping prior to highpass filtering is to reduce noise.

The effect of a function such as Curve 1, shown in FIG. 6, is illustrated in FIG. 7. This shows the effect of applying a conventional fixed pixel mapping function to an image that contains a single 'edge'. Here the edge is a transition from dark to light i.e. from very low intensity pixel values to very high intensity pixel values. In other words, the image contains just two regions, one of low luminance values and one of high luminance values, as shown in FIG. 7a. FIG. 7b presents a graph of pixel values created by scanning across a row of pixels from left to right. It is assumed that the two regions, which should be of essentially uniform intensity, exhibit some degree of noise. The noise manifests itself as small variations in pixel value (as can be seen from the 'ripple' in FIG. 7b). By applying the fixed pixel mapping function illustrated in FIG. 7c, the noise in the image of FIG. 7b can be suppressed effectively. The result of the fixed pixel mapping function is illustrated in FIG. 7d. The way in which the noise is suppressed can be understood by examining the pixel mapping function in detail. It should be appreciated that the pixel mapping function describes the way in which pixel values in the original image (i.e. that described by FIG. 7b) are converted into pixel values in the contrast enhanced (adjusted) image, whose pixel value profile is illustrated in FIG. 7d. Considering first reduction of noise in the low intensity region of the image, the relevant part of the pixel mapping function is that labelled 'A' in FIG. 7c. This part of the pixel mapping function determines how low intensity pixel values in the original image are translated into low intensity pixel values in the contrast enhanced image. Here the pixel mapping function has a gradient less than 1, indicating that variations in pixel value will be reduced (or 'compressed') by applying the function. The same is true in region 'B' of the pixel mapping function of FIG. 7c. This part of the curve determines the way in which high intensity pixel values in the original image are translated into high intensity pixel values in the contrast-enhanced image. Thus, noise is effectively reduced at both extremes of the range. Referring to how mid-range intensity values are converted by the pixel mapping function in this example, the part of the function labelled 'C' has a gradient greater than 1 and therefore, the range of pixel value variation in this region is actually enhanced (expanded or stretched), changing the profile of the transition between low and high intensity values. However, this effect cannot be considered as a true sharpening of the transition, such as that provided by unsharp masking. Contrast expansion has the effect of enhancing the difference between nearly identical mid-range pixel values and inevitably enhances the effect of noise in the pixel value range around the transition.

The use of conventional fixed pixel mapping functions in order to condition an image prior to unsharp masking has certain limitations. These will be described with reference to FIG. 8, which illustrates the effect of using the same pixel mapping function, introduced above, to enhance the contrast of a second example image. As in the first example, the image considered in FIG. 8 is a very simple one, comprising two substantially uniform regions, one darker than the other (FIG. 8a). The difference in intensity values between the two regions is less than in the previous example, although the same kind of noise is present (FIG. 8b). The effect of the fixed pixel mapping function is illustrated in FIG. 8d. While noise in the darker region is suppressed, noise in the lighter region is actually enhanced. This effect occurs because the pixel values of the lighter region correspond to a region of the pixel mapping function that has a gradient greater than one. Thus, small differences in pixel value are enhanced, rather than suppressed, causing an increase in noise.

It is common that images are processed using both (fixed or histogram-based) pixel mapping contrast algorithms and unsharp masking edge enhancement algorithms. Referring to FIG. 9, the combination of histogram-based pixel mapping and unsharp masking can be implemented by placing the histogram-based pixel mapping in the original image signal branch before (Option A), after (Option C), or in parallel (Option B) with an edge enhancement unit. Commonly, image processing applications, such as certain commercially available software packages, implement options A or C, giving rise to a cascaded structure. However, it has been found that the best results are achieved by option B, in which a histogram-based pixel mapping unit is placed inside the unsharp masking unit, that is in the original image signal branch, in parallel with the highpass filter and not in cascade with it as in options A and C. In option B, any unwanted noise component that is emphasised by contrast enhancement, is not highpass filtered and thus not further emphasised. In both options A and C the second operation in the cascaded structure further emphasises noise artefacts introduced by the first operation. Here, the second operation refers to the latter operation, i.e. in option A, the second operation is unsharp masking, and in option C the second operation is histogram-based pixel mapping. Thus, the cascaded approach has the disadvantage that noise is 'doubly' enhanced. This can create very annoying noise structures, especially if a JPEG or DCT based hybrid codec has been used to compress the original source image. For example, assuming option A is used, initial contrast enhancement causes a certain increase in pixel value noise. This is further exaggerated by the following step of edge enhancement using e.g. unsharp masking. In the case of option C, because the unsharp masking emphasises edges it also heightens noise around edges. The amplitude of this noise is then further increased by the histogram-based contrast enhancement. Also, other artefacts caused by the unsharp masking, for example ringing effects may become more visible. The approach illustrated by option B, on the other hand, avoids double noise enhancement. Here, contrast and edge enhancement are performed in parallel and the high pass filtered image is added to the contrast enhanced image (as indicated by the addition symbol in FIG. 9).

Nevertheless, the combined image enhancement options of FIG. 9 suffer from the problems associated with contrast and edge enhancement previously described above.

SUMMARY OF THE INVENTION

Against this background, and in one aspect, the present invention resides in a method for image enhancement of a digital image comprising a set of image pixels, the method comprising applying an inverse histogram-based mapping function to the image pixels.

The inverse histogram-based pixel mapping function can be applied alone, or in connection with any of options A, B and C described above. In a particularly preferred embodiment, inverse histogram-based pixel mapping is applied in connection with option B.

Alternatively, an inverse histogram-based pixel mapping function is applied in connection with any image processing function. Preferably, the inverse histogram-based pixel mapping function is applied in connection with an image processing function that tends to enhance noise visibility. Most preferably, the inverse histogram-based pixel mapping function is applied as a pre-processing step prior to an image processing function that tends to enhance noise visibility.

In a preferred form of this aspect of the invention, an inverse histogram-based pixel mapping step is combined with an edge enhancement step, such as unsharp masking. In such an arrangement the inverse histogram-based pixel mapping step improves the performance of the unsharp masking step. It also has an advantageous effect on combinations of contrast enhancement and unsharp masking techniques.

As explained earlier, unsharp masking techniques augment the subjective sharpness of an image by adding overshoot and undershoot components to edges within an image. The effect of inverse histogram-based pixel mapping is to change the pixel values according to their frequency of occurrence. In embodiments in which the inverse histogram-based pixel mapping step is combined with an edge enhancement step, such as unsharp masking, the role of the inverse histogram based pixel mapping is to act as a pre-processor for the highpass filter unit inside the edge enhancement unit, that alters pixel values in such a way that noise enhancement introduced by subsequent edge enhancement is reduced.

This arrangement serves to minimize the amplification of noise components, while desired signal components are enhanced. More specifically, inverse histogram-based pixel mapping produces a reduction in contrast at signal ranges containing a large number of pixels and an increase in contrast elsewhere. Thus, noise is suppressed in e.g. uniform areas, where it is subjectively most visible. It has been found that the effect is substantially the same when inverse histogram-based pixel mapping is applied to: a) a large uniform area, and b) an area containing a large number of pixels having a small number of different values (e.g. a speckled region).

According to the first aspect of the invention, there is also provided a device, such as a portable radio communication device, comprising means for performing said image enhancement method.

According to the first aspect of the invention, there is further provided a software program, comprising machine readable instructions for causing a processor unit to perform said image enhancement method. The first aspect of the invention also extends to a software program product stored on a medium and configured to perform said image enhancement method.

According to a second aspect of the invention, there is provided a method for image enhancement of a digital image comprising a set of image pixels, the method comprising applying, in a branch of an edge enhancement unit that is parallel to an original image branch, a histogram-based pixel mapping function to said set of image pixels prior to applying a highpass filter in said branch.

As described earlier, use of a fixed pixel mapping function in connection with unsharp masking prior to high-pass filtering is known, as illustrated in FIG. 5. This has the disadvantage that such a function can only be chosen to enhance contrast in certain pixel value ranges. Furthermore, its effect on noise components in the image varies according to the nature of the image, as evidenced by the description of FIGS. 7 and 8. Accordingly, the inventors have noted that because the function illustrated in FIG. 6 is constructed artificially it cannot be altered to adapt to image content and is therefore not optimal for all images.

In contrast, the inventors have recognised that because a histogram-based pixel mapping function is constructed with reference to the image itself, it is adaptive to image content and hence some of the problems relating to noise enhancement can be reduced.

Used in conjunction with edge enhancement, the histogram can be adapted such that once a histogram of pixel values within an image has been determined, the profile of the histogram may be altered in order to change the nature of the pixel mapping function created from it.

BRIEF DESCRIPTION OF THE DRAWINGS

Referring now to the accompanying drawings, FIGS. 1 to 9 are used in conjunction with an account of the prior art in which;

FIG. 1 shows a histogram and corresponding mapping function;

FIG. 2 illustrates a non-linear mapping function;

FIG. 3 shows a block diagram of an unsharp masking scheme;

FIG. 4 illustrates the effect of an unsharp masking scheme on an edge of an image signal;

FIG. 5 shows an unsharp masking scheme with a fixed pixel-mapping unit prior to a highpass filter of the unsharp masking scheme;

FIG. 6 illustrates two possible curves of a pixel mapping function of FIG. 5;

FIG. 7 shows the fixed pixel mapping function applied to an edge in a first noisy image;

FIG. 8 shows a fixed pixel mapping function applied to an edge in a second noisy image;

FIG. 9 shows possible locations for a contrast enhancement unit.

Figure 1:
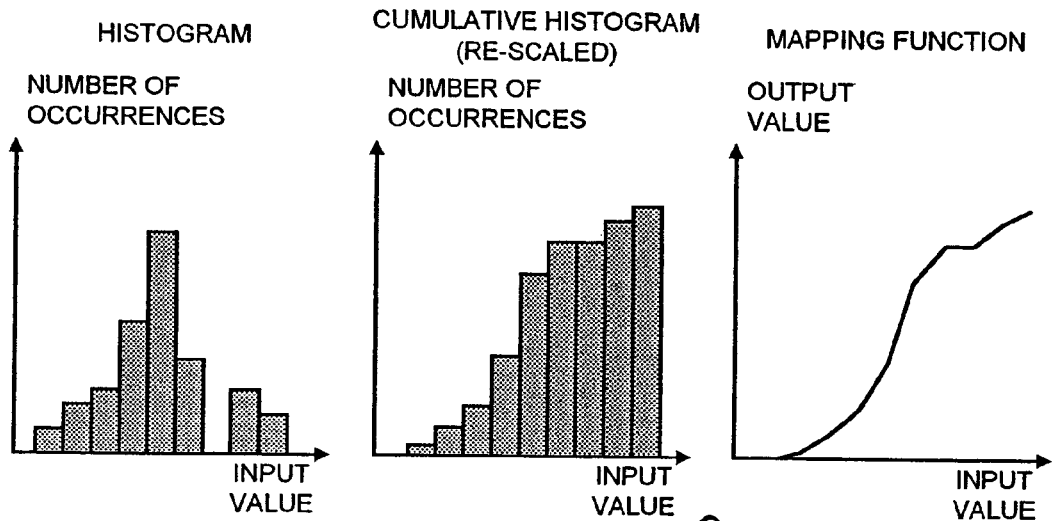
Figure 2:
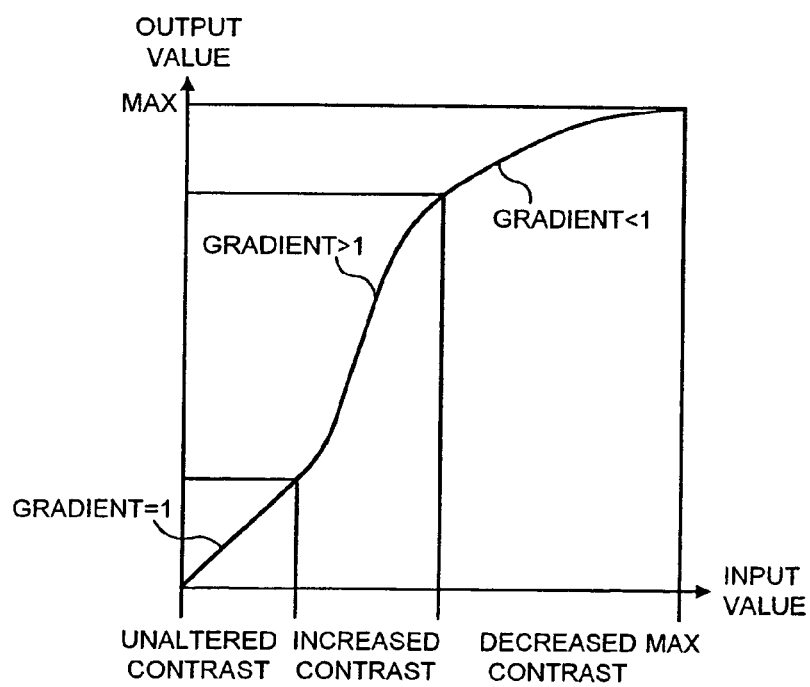
Figure 5:
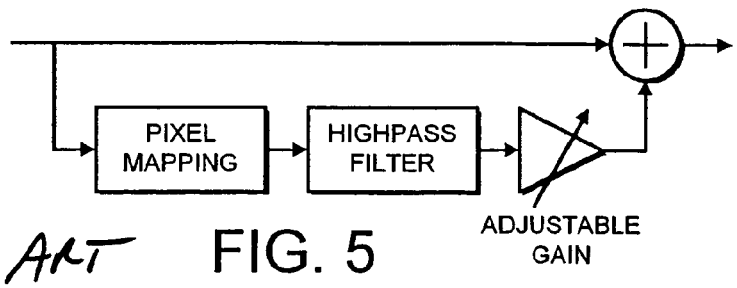
Figure 6:
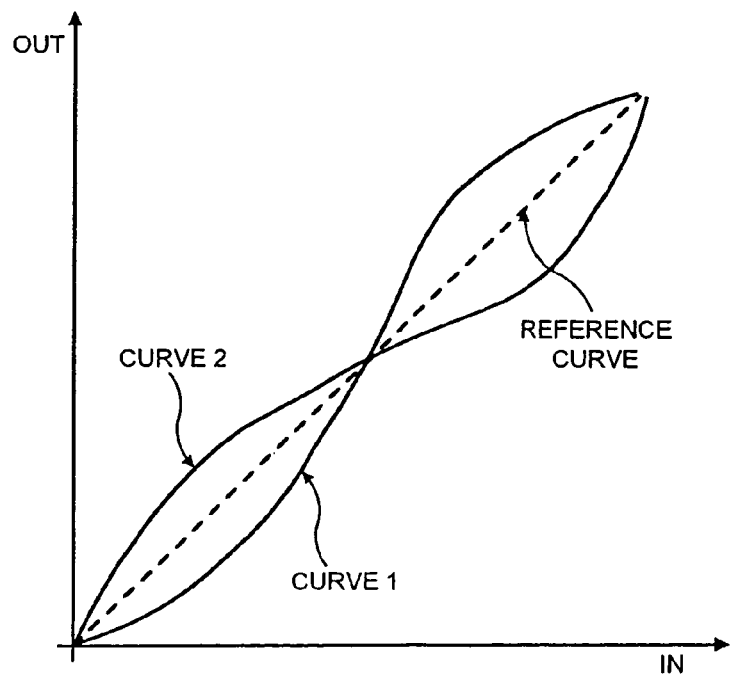
Figure 7:
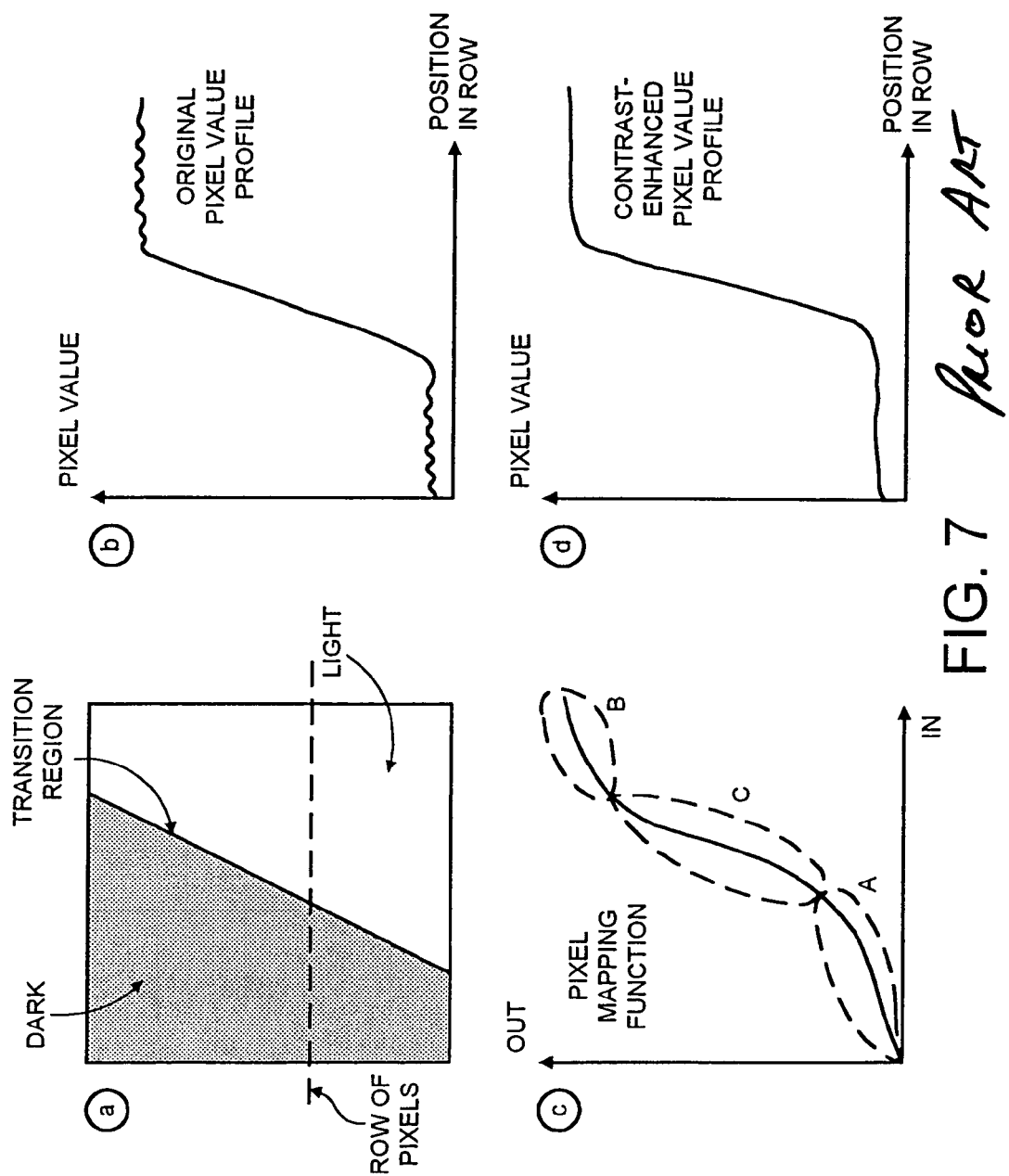
Figure 8:
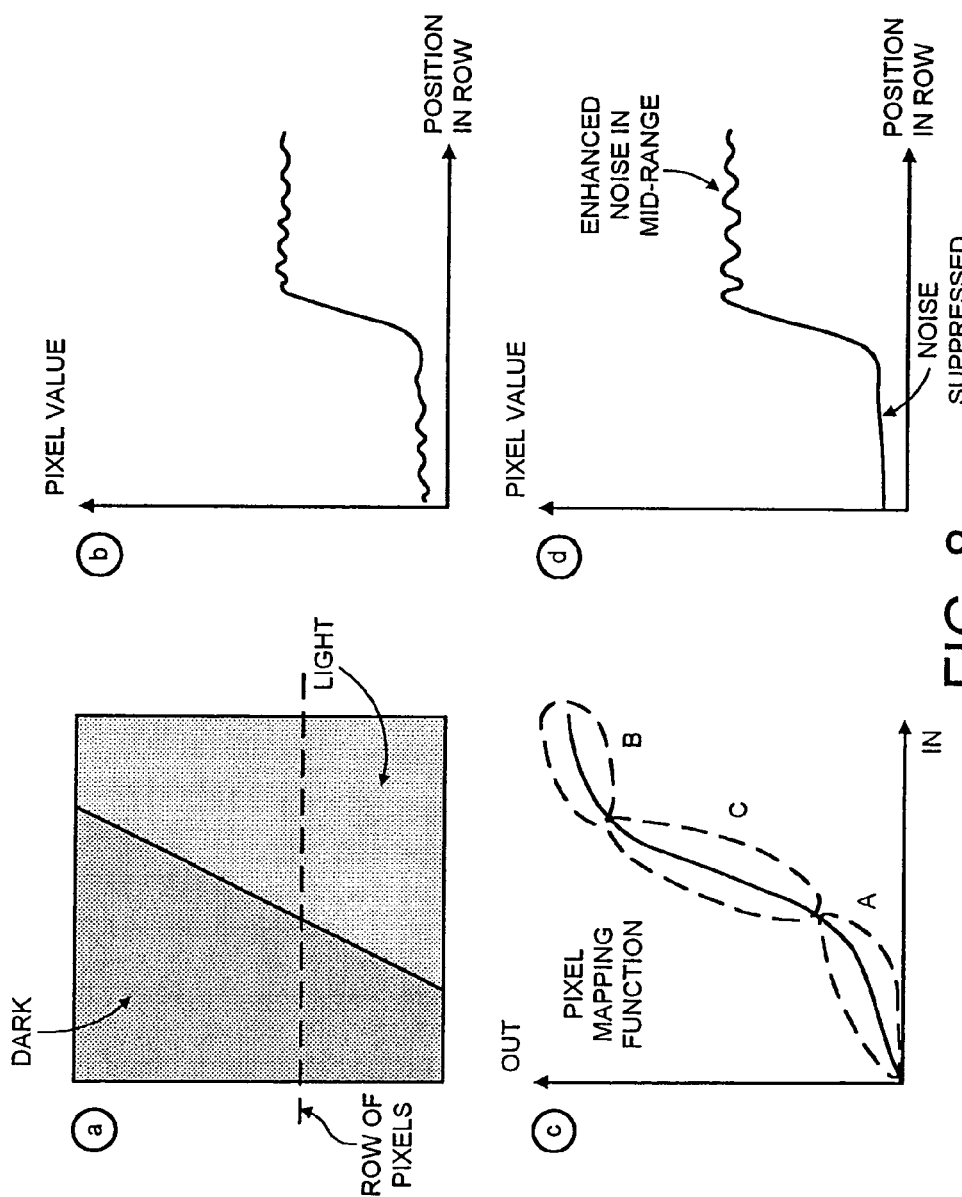
Figure 9:
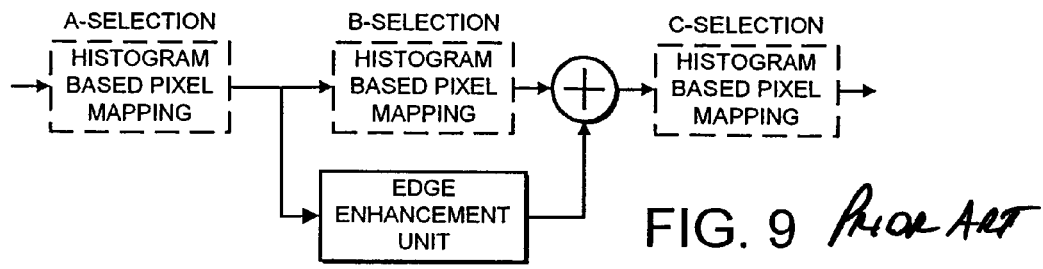
Figure 10:
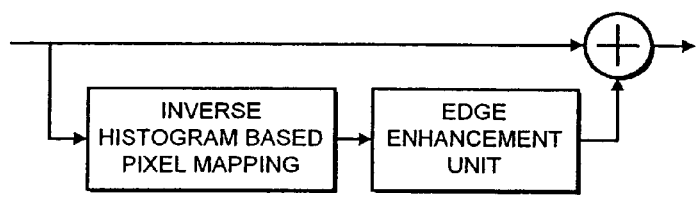
Figure 11:
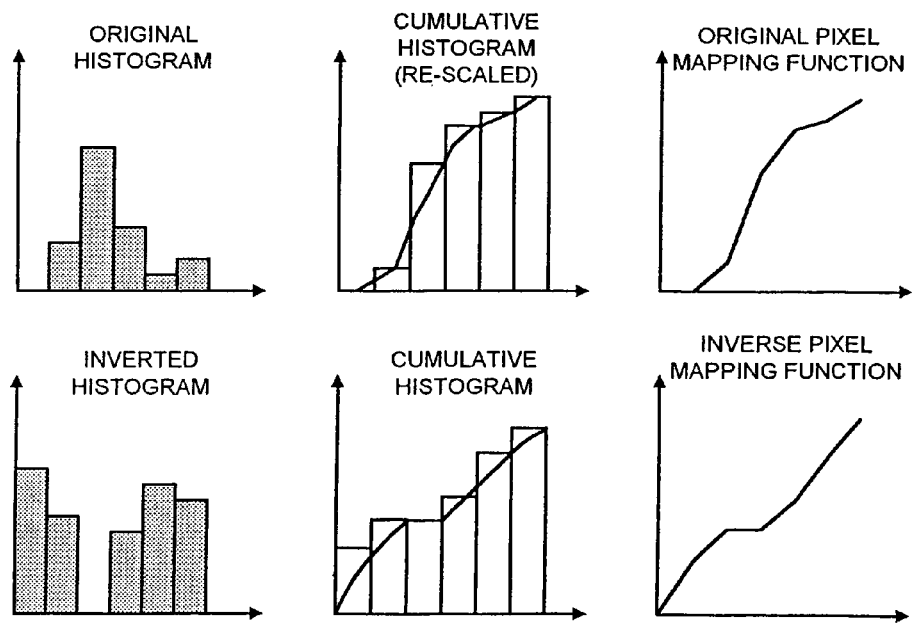
Figure 15:
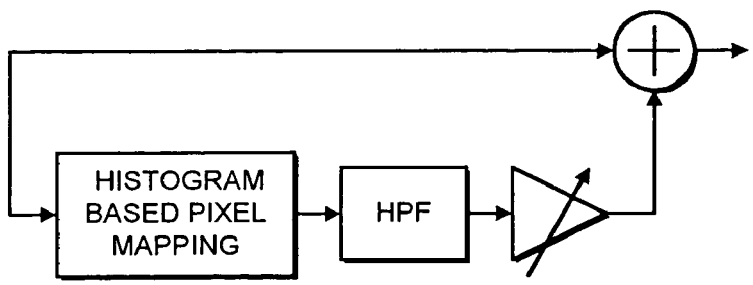

The present invention will now be described, by way of example only, with reference to the accompanying drawings, in which:

FIG. 10 illustrates one embodiment of the first aspect of the present invention;

FIG. 11 illustrates an inverted histogram constructed according to the embodiment of FIG. 10;

FIGS. 12, 13 and 14a–e show alternative arrangements of the first aspect of the present invention; and FIG. 15 shows an embodiment according to a second aspect of the invention.

DETAILED DESCRIPTION OF THE INVENTION

The first aspect of the present invention resides in the provision of an inverse histogram-based pixel mapping technique for enhancing a digital image. As is well know, a digital image comprises an array of pixels. In the case of a monochrome image, each pixel has a pixel value within a certain range (e.g. 0–255), which denotes the pixel's luminance. In a color image, pixel values may be represented in a number of different ways. In a commonly used representation, referred to as the RGB color model, each pixel is described by three values, one corresponding to the value of a Red color component, another corresponding to the value of a Green color component and the third corresponding to the value of a Blue color component. Numerous other color models exist, in which alternative representations are used. In one such alternative model, know as the YUV color model, image pixels are represented by a luminance component and two chrominance or color difference components, each of which has an associated pixel value. Generally, color models that employ luminance and color difference components provide a more efficient representation of a color image than the RGB model. It is also know that the luminance component of such color models generally provides the most information about the perceived structure of an image. Therefore, application of the present invention may vary according to the color model used to represent a particular image. For example, in an image represented using the RGB color model, the method according to the invention may be applied to one, two, or all three color components. On the other hand, if an image is represented using the YUV model, it may be more efficient, for example, to apply the method according to the invention to just the Y component. However, in general, the method according to the invention can be applied to all components, or any combination (including just one) of the components of a particular color model. Thus, it should be appreciated that the choice of color model is essentially insignificant for application of the invention, as the basic principles used to construct the inverse histogram-based mapping function can be applied to any color model comprising any number of components.

Whilst this invention can be used in isolation to operate on an image, it has been found that it provides particularly beneficial results when used with any image processing function that tends to increase noise visibility. The approach of the present invention, as well as being a method, resides also in a device that includes means for applying inverse histogram-based pixel mapping to a digital image. In a specific context, the device may be a mobile telecommunications terminal, such as a mobile phone, that has the conventional radio frequency, hardware and software means normally required of a mobile phone and that is equipped with image processing capability and/or image capturing and display means. Alternatively, the device may simply be a computer equipped with digital image processing means implementing the method according to the invention. In the former case, the mobile terminal is able to make use of the present invention prior to transmission of a captured image, and/or for processing received images for display on the mobile terminal.

Referring initially to FIG. 10, there is shown one embodiment of an inverse histogram-based pixel mapping unit that is provided as a preconditioning unit for a highpass filter unit inside an unsharp masking unit. The inverse histogram-based pixel mapping unit is disposed in series with the highpass filter that is inside the edge enhancement unit and both are in a branch or loop that is parallel to the original image signal branch.

The inverse histogram-based pixel mapping function can be formed, for example, by inverting an image histogram and then subtracting the inverted histogram from the maximum value of the original histogram. This method is illustrated in FIG. 11. A standard histogram is first obtained from an image and the maximum value of the histogram is determined. Then, every value in the histogram is subtracted from this maximum value. Next, a cumulative histogram is created. Finally, the inverse histogram-based pixel mapping function is derived from the cumulative histogram. After inversion of the histogram, the mapping function is formed in a manner analogous to that used in the conventional histogram-based pixel mapping method. It should be appreciated that the inverse histogram-based pixel mapping function is not an inverse function in a strict mathematical sense (i.e. $f_{inv}(x) \neq f^{-1}(x)$).

Thus, in one way the formation of the inverse histogram-based mapping function comprises the steps of: constructing a histogram of image pixel values, optionally processing the histogram, making an inverse histogram from the histogram, optionally processing the inverse histogram, making a cumulative inverse histogram from the inverse histogram, optionally processing the cumulative inverse histogram, making an inverse histogram-based pixel mapping function from the inverse histogram, optionally processing the inverse mapping function, and mapping pixel values using the inverse histogram-based pixel mapping function.

The "inversion" can be performed on the cumulative histogram, or alternatively it can be applied to the mapping function. For example, formation of an inverse histogram-based pixel mapping function may comprise the steps of: constructing a histogram of image pixel values, optionally processing the histogram, making a cumulative histogram, optionally processing the cumulative histogram, making a mapping function from the cumulative histogram, optionally processing the mapping function, making an inverse mapping function, optionally processing the inverse mapping function and, mapping pixel values using the inverse histogram-based pixel mapping function.

In constructing a histogram it is possible that regional histograms could be used, i.e. a histogram representing a localised portion of the image. The original histogram may be processed or modified before constructing an inverse histogram. Modifications can also be applied to the inverted histogram. In addition, it is also possible to make an inverse mapping function from a mapping function derived from the original histogram. It should also be noted that the inverse histogram-based mapping function can be applied to all the pixels within an image or to a set of image pixels, for example pixels corresponding to a specific region within an image.

Because the inverse histogram-based pixel mapping function is derived from the inverse histogram via an inverse cumulative histogram, and the conventional (non-inverted) histogram-based pixel mapping function is derived from an image histogram via a cumulative histogram, the inverse histogram-based pixel mapping function and conventional histogram-based pixel mapping function share a relationship with one another. Therefore, as explained above, there are various ways to construct an inverse histogram-based pixel mapping function from a conventional histogram-based pixel mapping function or from a cumulative histogram. For example, if the conventional histogram-based mapping function is differentiated, the derivative is inverted (in this context the inversion means subtraction from the maximum value) and the result is integrated, the obtained mapping function is the inverse histogram-based pixel mapping function.

In an alternative approach, the inverse histogram-based pixel mapping function is produced by subtracting each value of a cumulative histogram (formed in a conventional manner) from a value larger than the maximum histogram value. Furthermore, adding an offset to the maximum value allows limitation of the maximum dynamic range suppression (no zero slopes). Other modifications can also be applied to the inverted histogram prior to formation of the inverse histogram-based pixel mapping function. What should be noted is the principal shape of the inverted histogram compared to the original. Peaks in the original histogram are transformed into troughs in the inverse histogram and vice versa. In mapping function terms this means that regions of high-gradient are transformed to regions of low-gradient and vice versa.

Accordingly, the inverse histogram-based pixel mapping function is formed so that it has a high slope corresponding to low values in the image histogram (i.e. pixel value ranges with a small number of occurrences) and a low slope corresponding to high values in the image histogram (i.e. pixel value ranges with a large number of occurrences). The effect of mapping input pixel values to output pixel values using this kind of function is that contrast is reduced in signal ranges containing a large number of pixels and increased elsewhere. This kind of contrast manipulation decreases the visibility of small variations and noise in the statistically most important signal ranges. For example, pixel value ranges that contain large numbers of pixels typically correspond to areas of an image having a substantially uniform intensity or colour. It is in precisely these areas that noise, i.e. small variations in pixel value are subjectively most visible.

It has been found that by applying a pixel mapping function constructed from an inverse histogram of the image to the image prior to the edge enhancement unit of an unsharp masking block, the problem of amplification of noise ordinarily caused by unsharp masking is significantly reduced. Noise amplification is particularly disturbing when a JPEG or DCT based hybrid codec has been used to compress the source image, and the present invention has been found to be particularly useful when applied to such images.

Because inverse histogram-based pixel mapping reduces contrast and noise visibility in statistically important signal ranges, noise enhancement produced by unsharp masking is also reduced at these signal ranges. This has an advantageous effect, for instance, when the image contains a relatively wide and smooth area. Such an extensive smooth area gives rise to a concentration of high values in the image histogram. Inverse histogram-based pixel mapping has the effect of reducing noise amplification due to subsequent unsharp masking, particularly in such a large and smooth area. Elsewhere the unsharp masking sharpens edges without restrictions. Thus, while edges are suppressed in one part of the dynamic range e.g. for pixel values representing a large smooth area, they are enhanced elsewhere in the dynamic range. Therefore "real edges" between regions are enhanced without restrictions.

As previously explained, image processing operations often include both unsharp masking and a histogram based pixel-mapping algorithm for contrast enhancement. In this case, it has been found that application of the method according to the present invention significantly improves the resulting picture quality. Inverse histogram-based pixel mapping reduces noise amplification in the areas of the image that are emphasised by the contrast enhancement algorithm. Due to this feature, both algorithms do not enhance the noise.

Figure 12:
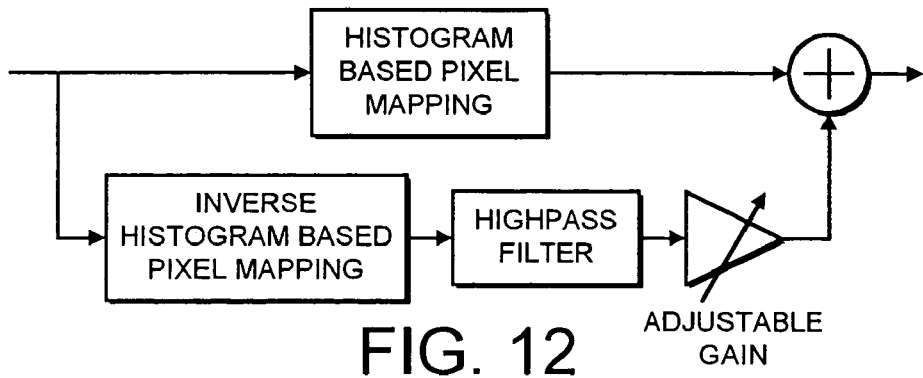

FIG. 12 shows an example of an implementation of the present invention in which inverse histogram-based pixel mapping is used in conjunction with conventional histogram-based pixel mapping contrast enhancement and unsharp masking. A conventional histogram-based pixel mapping contrast enhancement unit is placed in the original image branch of the unsharp masking unit, and an combination of a inverse histogram-based pixel-mapping unit and an unsharp masking unit is placed in a branch that is parallel to the original image branch. The output of the parallel branch is added to the output of the histogram-based pixel mapping contrast enhancement unit.

Figure 13:
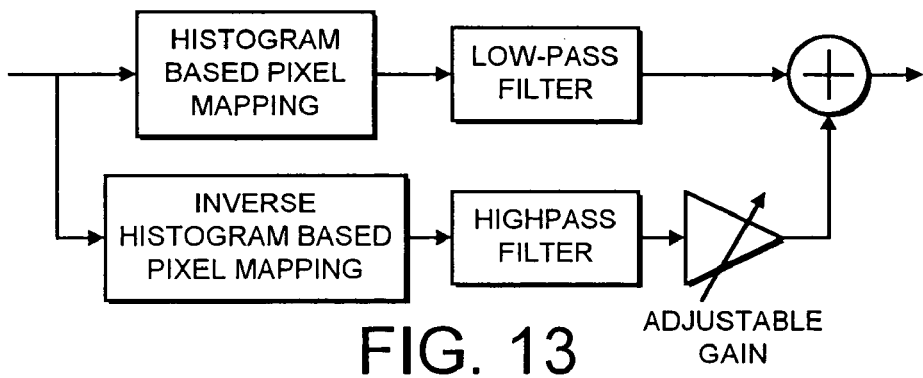

FIG. 13 shows a modified arrangement in which an additional (low-pass) filtering block added in the original image branch (into the upper path), after the contrast enhancement operation. The purpose of the filtering block is to reduce the noise introduced by conventional histogram-based contrast enhancement.

A second aspect of the invention is depicted in FIG. 15, in which there is provided a histogram-based pixel mapping unit alongside and prior to an unsharp masking unit in a branch of an image enhancement arrangement, the branch being parallel to the original image branch. The output of the parallel branch is added to the original image. With this arrangement because the mapping function adapts to the image content, noise enhancement has been found to be reduced.

The present invention may also be applied for enhancement of digital video sequences, in which case it is advantageous to add temporal processing to the histogram. A video signal consists of a sequence of digital images. Each image can be enhanced individually, but the same histogram cannot be used for two images that have different content. This means that histograms are preferably gathered for each image. However, processing images in the video sequence individually produces disturbing flicker, because even quite unnoticeable visual differences can cause two images to have substantially different histograms. Therefore, temporal processing, for example low pass filtering, of the histograms is needed. Typically this kind of processing is adaptive to sudden large changes in image characteristics, for example due to scene-cuts.

Figure 14:
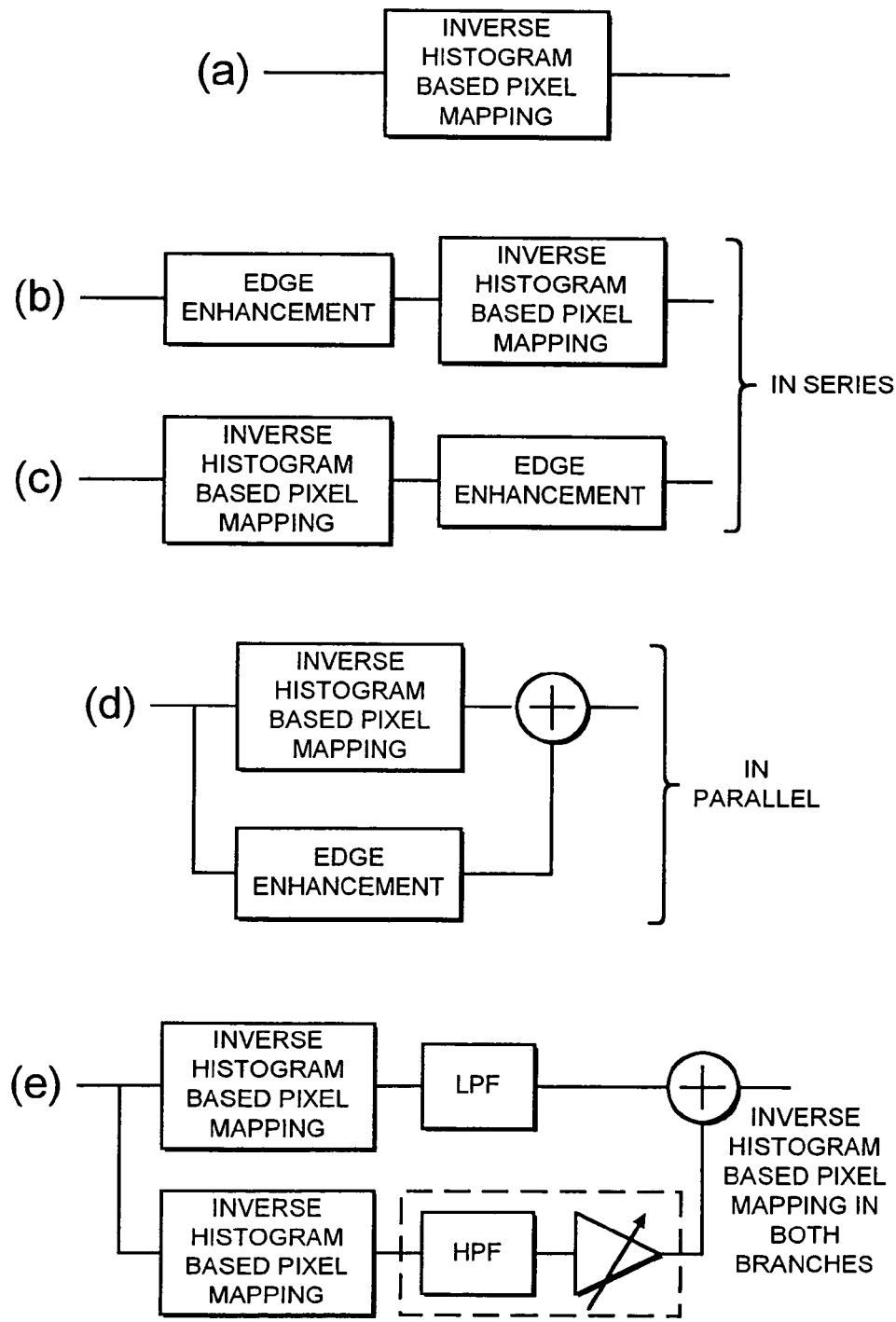

The present invention may be embodied in other specific forms without departing from its essential attributes. The inverse histogram-based pixel mapping function of the present invention has been described above in the context of a pre-processor for an edge enhancement function. However, the present invention may be used on its own or in a variety of different ways. FIG. 14 illustrates a number of different applications of an inverse histogram-based mapping function unit. FIG. 14a shows the inverse histogram-based mapping unit applied on its own to an image. FIG. 14b shows the inverse histogram-based mapping unit as a post-processing unit for an edge enhancement unit. FIG. 14c shows the inverse histogram based mapping unit as a pre-processing unit for an edge enhancement unit. FIG. 14d shows an inverse histogram-based mapping unit in parallel with an edge enhancement unit. FIG. 14e shows two inverse histogram-based mapping units, one in an original image branch and used as a pre-processing unit for a low pass filter, and the other one in a parallel branch, as a pre-processing unit for an edge enhancement unit. Other inverse histogram-based mapping arrangements are possible, in which the method comprises applying the image's statistical data-dependent pixel mapping function to the image pixels in such a way that image contrast is reduced in signal ranges containing a large number of pixels and increased in other signal ranges.

Accordingly reference should be made to the appended claims and other general statements herein rather than to the foregoing specific description as indicating the scope of invention.

Furthermore, each feature disclosed in this specification (which term includes the claims) and/or shown in the drawings may be incorporated in the invention independently of other disclosed and/or illustrated features. In this regard, the invention includes any novel features combination of features disclosed herein either explicitly or any generalisation thereof irrespective of whether or not it relates to the claimed invention or mitigates any or all of the problems addressed.

The appended abstract as filed herewith is included in the specification by reference.

What is claimed is:

1. A method for enhancing a digital image which includes a plurality of image pixels, said method comprising:
   constructing a histogram of pixel values from at least part of said image pixels;
   forming an inverse histogram from said histogram;
   forming a cumulative inverse histogram from said inverse histogram;
   deriving an inverse histogram-based pixel mapping function from said cumulative inverse histogram; and
   applying the inverse histogram-based pixel mapping function to a set of image pixels.

2. A method according to claim 1, wherein said inverse histogram-based pixel mapping function is modified to form a modified inverse histogram-based pixel mapping function and said modified inverse histogram-based pixel mapping function is applied to the set of image pixels.

3. A method according to claim 1, wherein said histogram is constructed from all image pixels of said digital image.

4. A method according to claim 1, wherein said histogram is constructed from a part of all image pixels of said digital image.

5. A method according to claim 1, wherein the inverse histogram-based pixel mapping function is applied to the set of image pixels prior to or after applying an edge enhancement function.

6. A method according to claim 1, wherein the step of constructing a histogram of pixel values comprises:
   defining a set of pixel value ranges; and
   for each pixel value range, counting the number of image pixels from said at least part of said image pixels that have values within that range.

7. A method according to claim 6, wherein said step of forming an inverse histogram from said histogram comprises:
   identifying a pixel value range having a maximum number of image pixels; and
   for each pixel value range, subtracting the number of image pixels within that range from said maximum number, thereby forming a modified value for each pixel value range.

8. A method according to claim 6, wherein said step of forming an inverse histogram from said histogram comprises:
defining a reference value; and
for each pixel value range, subtracting the number of image pixels within that range from said reference value, thereby forming a modified value for each pixel value range.

9. A method according to claim 6, wherein said step of forming an inverse histogram from said histogram comprises:
identifying a pixel value range having a maximum number of image pixels;
defining a reference value greater than said maximum number; and
for each pixel value range, subtracting the number of image pixels within that range from said reference value, thereby forming a modified value for each pixel value range.

10. A method according to claim 7, 8, or 9, wherein said step of forming a cumulative inverse histogram comprises:
for each pixel value range, adding to the modified value for that range, formed during said step of forming an inverse histogram, the modified values for all pixel value ranges comprising smaller pixel values than that range, formed during said step of forming an inverse histogram; and
storing the value thus obtained in a corresponding pixel value range of the cumulative inverse histogram.

11. A method according to claim 10, wherein said inverse histogram-based pixel mapping function is derived from said cumulative inverse histogram using the value of each pixel value range of said cumulative inverse histogram.

12. A method according to claim 10, wherein said inverse histogram-based pixel mapping function is derived from said cumulative inverse histogram by interpolating between pixel value ranges of said cumulative inverse histogram.

13. A method according to claim 1, wherein said inverse histogram-based pixel mapping function is scaled to a predetermined maximum value.

14. A method according to claim 1, wherein said histogram of pixel values is processed to form a modified histogram before said step of forming an inverse histogram.

15. A method according to claim 1, wherein said inverse histogram is processed to form a modified inverse histogram before said step of forming a cumulative inverse histogram.

16. A method according to claim 1, wherein said cumulative inverse histogram is processed to form a modified cumulative inverse histogram before said step of deriving an inverse histogram-based pixel mapping function.

17. A method for enhancing a digital image which includes a plurality of image pixels, said method comprising:
constructing a histogram of pixel values from at least part of said image pixel values;
forming a cumulative histogram from said histogram;
deriving a mapping function from the cumulative histogram;
forming an inverse histogram-based pixel mapping function from said mapping function; and
applying the inverse histogram-based pixel mapping function to a set of image pixels.

18. A method according to claim 17, wherein said step of forming the inverse histogram-based pixel mapping function from said mapping function comprises:
differentiating said mapping function to form a differentiated mapping function;
finding the maximum value of said differentiated mapping function; and
subtracting said maximum value from said differentiated mapping function and integrating the result.

19. A method according to claim 17, wherein the step of constructing a histogram of pixel values comprises:
defining a set of pixel value ranges; and
for each pixel value range, counting the number of image pixels from said at least part of said image pixels that have values within that range.

20. A method according to claim 19, wherein said step of forming a cumulative histogram comprises:
for each pixel value range, adding to the number of image pixels within that range the number of image pixels in all pixel value ranges comprising smaller pixel values than that range.

21. A method according to claim 20, wherein said mapping function is derived from said cumulative histogram using a number of image pixels within each pixel value range of said cumulative histogram.

22. A method according to claim 20, wherein said mapping function is derived from said cumulative histogram by interpolating between pixel value ranges of said cumulative histogram.

23. A method according to claim 17, wherein said histogram of pixel values is processed to form a modified histogram before said step of forming a cumulative histogram.

24. A method according to claim 17, wherein said cumulative histogram is processed to form a modified cumulative histogram before said step of deriving a mapping function.

25. A method according to claim 17, wherein said mapping function is processed to form a modified mapping function before said step of forming the inverse histogram-based pixel mapping function.

26. A method according to claim 1, wherein said inverse histogram-based pixel mapping function is applied to the set of image pixels prior to or after applying another image processing function.

27. A method according to claim 26, wherein said other image processing function has the effect of increasing pixel value variation.

28. A method according to claim 1, wherein the inverse histogram-based pixel mapping function is applied in an original signal branch and an edge enhancement unit is applied in a branch parallel to the original signal branch.

29. A method according to claim 1, wherein the inverse histogram-based pixel mapping function is applied in an original signal branch and in a branch parallel to the original signal branch having an edge enhancement unit.

30. A computer program product comprising a computer usable medium having computer readable program code embodied therein for performing a method for enhancing a digital image according to claim 1.

31. A method according to claim 1, wherein the inverse histogram-based pixel mapping function decreases the contrast of the digital image for image pixels that have values with a frequency of occurrence exceeding a pre-determined amount.

32. A method according to claim 31, wherein the inverse histogram-based pixel mapping function increases the contrast of the digital image for image pixels having values with a frequency of occurrence less than said predetermined amount.

33. A method according to claim 17, wherein said inverse mapping function is scaled to a predetermined maximum value.

34. A method according to claim 17, wherein the inverse histogram-based pixel mapping function is applied in an original signal branch and an edge enhancement unit is applied in a branch parallel to the original signal branch.

35. A method according to claim 17, wherein the inverse histogram-based pixel mapping function is applied in an original signal branch and in a branch parallel to the original signal branch having an edge enhancement unit.

36. A method according to claim 17, wherein said histogram is constructed from all image pixels of said digital image.

37. A method according to claim 17, wherein said histogram is constructed from a part of all image pixels of said digital image.

38. A method according to claim 17, wherein said inverse histogram-based pixel mapping function is applied to the set of image pixels prior to or after applying another image processing function.

39. A method according to claim 38, wherein said other image processing function has the effect of increasing pixel value variation.

40. A method according to claim 17, wherein the inverse histogram-based pixel mapping function is applied to the set of image pixels prior to or after applying an edge enhancement function.

41. A computer program product comprising a computer usable medium having computer readable program code embodied therein for performing a method for enhancing a digital image according to claim 17.

42. A method according to claim 17, wherein the inverse histogram-based pixel mapping function decreases the contrast of the digital image for image pixels that have values with a frequency of occurrence exceeding a pre-determined amount.

43. A method according to claim 42, wherein the inverse histogram-based pixel mapping function increases the contrast of the digital image for image pixels having values with a frequency of occurrence less than said predetermined amount.

44. A portable radio communication device comprising:
an input which inputs image pixels of a digital image; and
an image processor for enhancing said digital image, wherein said image processor constructs a histogram of pixel values from at least part of said image pixel values, forms a cumulative histogram from said histogram, derives a mapping function from the cumulative histogram, forms an inverse histogram-based pixel mapping function from said mapping function, and applies the inverse histogram-based pixel mapping function to a set of image pixels.

45. A portable radio communication device comprising:
an input which inputs image pixels; and
an image processor for enhancing a digital image comprising image pixels,
wherein said image processor, constructs a histogram of pixel values from at least part of said image pixels, forms an inverse histogram from said histogram, forms a cumulative inverse histogram from said inverse histogram, derives an inverse histogram-based pixel mapping function from said cumulative inverse histogram, and applies the inverse histogram-based pixel mapping function to a set of image pixels.

46. An image processor for enhancing a digital image which includes a plurality of image pixels, comprising:
an input which inputs said image pixels; and
a processor which constructs a histogram of pixel values from at least part of said image pixels, forms an inverse histogram from said histogram, forms a cumulative inverse histogram from said inverse histogram, derives an inverse histogram-based pixel mapping function from said cumulative inverse histogram, and applies the inverse histogram-based pixel mapping function to a set of image pixels.

47. An image processor according to claim 46, wherein said processor forms a modified histogram from said histogram of pixel values.

48. An image processor according to claim 46, wherein said processor forms a modified inverse histogram from said inverse histogram.

49. An image processor according to claim 46, wherein said processor forms a modified cumulative inverse histogram from said cumulative inverse histogram.

50. An image processor according to claim 46, wherein the inverse histogram-based pixel mapping function is arranged to decrease the contrast of the digital image for image pixels that have values with a frequency of occurrence exceeding a pre-determined amount.

51. An image processor according to claim 50, wherein the inverse histogram-based pixel mapping function is arranged to increase the contrast of the digital image for image pixels having values with a frequency of occurrence less than said predetermined amount.

52. An image processor according to claim 46, wherein said processor constructs said histogram of pixel values by, defining a set of pixel value ranges, and for each pixel value range, counting the number of image pixels from said at least part of said image pixels that have values within that range.

53. An image processor according to claim 52, wherein said processor forms said inverse histogram from said histogram by identifying a pixel value range having a maximum number of image pixels for each pixel value range, subtracting the number of image pixels within that range from said maximum number, thus forming a modified value for each pixel value range, and storing the value thus obtained in a corresponding pixel value range of the inverse histogram.

54. An image processor according to claim 52, wherein said processor forms said inverse histogram from said histogram by defining a reference value, for each pixel value range, subtracting the number of image pixels within that range from said reference value, thus forming a modified value for each pixel value range, storing the value thus obtained in a corresponding pixel value range of the inverse histogram.

55. An image processor according to claim 52, wherein said processor forms said inverse histogram from said histogram by identifying a pixel value range having a maximum number of image pixels defining a reference value greater than said maximum number, for each pixel value range, subtracting the number of image pixels within that range from said reference value, thus forming a modified value for each pixel value range, and storing the value thus obtained in a corresponding pixel value range of the inverse histogram.

56. An image processor according to claim 53, 54 or 55, wherein said processor forms said cumulative inverse histogram by adding to the modified value for each pixel value range, the modified values for all pixel value ranges comprising smaller pixel values and storing the value thus obtained in a corresponding pixel value range of the cumulative inverse histogram.

57. An image processor according to claim 56, wherein said processor derives said inverse histogram-based pixel mapping function from said cumulative inverse histogram using the value of each pixel value range of said cumulative inverse histogram.

58. An image processor according to claim 56, wherein said processor derives said inverse histogram-based pixel mapping function from said cumulative inverse histogram by interpolating between pixel value ranges of said cumulative inverse histogram.

59. An image processor according to claim 46, wherein said processor constructs said histogram from all image pixels of said digital image.

60. An image processor according to claim 46, wherein said processor constructs said histogram from a part of the image pixels of said digital image.

61. An image processor for enhancing a digital image which includes a plurality of image pixels, comprising:
an input which inputs said pixels; and
a processor which constructs a histogram of pixel values from at least part of image pixel values of said image pixels, form a cumulative histogram from said histogram, derives a mapping function from the cumulative histogram, forms an inverse histogram-based pixel mapping function from said mapping function, and applies the inverse histogram-based pixel mapping function to a set of image pixels.

62. An image processor according to claim 61, wherein said processor forms a modified histogram from said histogram of pixel values.

63. An image processor according to claim 61, wherein said processor forms a modified cumulative histogram from said cumulative histogram.

64. An image processor according to claim 61, wherein said processor forms a modified mapping function from said mapping function.

65. An image processor according to claim 61, wherein said processor forms a modified inverse histogram-based pixel mapping function from said inverse histogram-based pixel mapping function.

66. An image processor according to claim 61, wherein the inverse histogram-based pixel mapping function is arranged to decrease the contrast of the digital image for image pixels that have values with a frequency of occurrence exceeding a pre-determined amount.

67. An image processor according to claim 66, wherein the inverse histogram-based pixel mapping function is arranged to increase the contrast of the digital image for image pixels having values with a frequency of occurrence less than said predetermined amount.

68. An image processor according to claim 61, wherein said processor forms the inverse histogram-based pixel mapping function from said mapping function by differentiating said mapping function to form a differentiated mapping function, finding the maximum value of said differentiated mapping function subtracting said maximum value from said differentiated mapping function and integrating the result.

69. An image processor according to claim 61, wherein said processor constructs said histogram of pixel values by defining a set of pixel value ranges, and for each pixel value range, counting the number of image pixels from said at least part of said image pixels that have values within that range.

70. An image processor according to claim 69, wherein said processor forms said cumulative histogram by adding to the number of image pixels within each pixel value range, the number of image pixels in all pixel value ranges comprising smaller pixel values.

71. An image processor according to claim 70, wherein said processor derives said mapping function from said cumulative histogram using the number of image pixels within each pixel value range of said cumulative histogram.

72. An image processor according to claim 70, wherein said processor derives said mapping function from said cumulative histogram by interpolating between pixel value ranges of said cumulative histogram.

73. An image processor according to claim 61, wherein said processor constructs said histogram from all image pixels of said digital image.

74. An image processor according to claim 61, wherein said processor constructs said histogram from a part of the image pixels of said digital image.

* * * * *